United States Patent [19]
Dockser

[11] Patent Number: 5,860,119
[45] Date of Patent: Jan. 12, 1999

[54] DATA-PACKET FIFO BUFFER SYSTEM WITH END-OF-PACKET FLAGS

[75] Inventor: Kenneth A. Dockser, San Jose, Calif.

[73] Assignee: VLSI Technology, Inc., San Jose, Calif.

[21] Appl. No.: 753,405

[22] Filed: Nov. 25, 1996

[51] Int. Cl.[6] .................................................. G06F 12/00
[52] U.S. Cl. ........................................ 711/156; 395/872
[58] Field of Search .............................. 711/156; 395/872

[56] References Cited

U.S. PATENT DOCUMENTS

| | | | |
|---|---|---|---|
| 5,210,749 | 5/1993 | Firoozmand | 370/463 |
| 5,349,683 | 9/1994 | Wu et al. | 371/49.2 |
| 5,361,334 | 11/1994 | Cawley | 348/389 |
| 5,406,554 | 4/1995 | Parry | 370/381 |
| 5,664,116 | 9/1997 | Gaytan et al. | 395/200.64 |

OTHER PUBLICATIONS

Flectcher, William J., *An Engineering Approach to Digital Design*, Prentice–Hall, Inc., Englewood Cliffs, NJ, 1980, pp. 418–421.

82930A *Unviersal Serial Bus Microcontroller User's Manual*, pp. 7-1-7-20. (No publication date or copyright date).

"Cypress Data Book: Memories, DataCom, FCT Logic, PC Products", Cypress Semiconductor Corp., San Jose, CA, 1–395DBOOK 8000, pp. 5–36 and 5–37, May 1995.

*Primary Examiner*—Tod R. Swann
*Assistant Examiner*—Felix B. Lee
*Attorney, Agent, or Firm*—Clifton L. Anderson

[57] ABSTRACT

A packet-data FIFO buffer system comprises a FIFO buffer with a series of FIFO memory locations. Each FIFO memory location includes a data section for storing a packet data word and a flag section for storing an indication of whether or not the associated data section includes the last word of a packet. The FIFO buffer capacity is not limited to the number of maximum length packets it can hold; instead, a greater number of small packets can be stored. This increases the effectiveness of available FIFO memory and minimizes communication delays along the channels serviced by the FIFO. The FIFO design is simple and fairly self contained so that minimal external logic and control is required. In addition, an indication of the presence or absence of a complete data packet in the FIFO buffer can be easily obtained by logically adding (ORing) the contents of the flag sections.

1 Claim, 2 Drawing Sheets

DATA-PACKET FIFO BUFFER SYSTEM WITH END-OF-PACKET FLAGS

BACKGROUND OF THE INVENTION

The present invention relates to computer systems and, more particularly, to packet-data FIFO buffers designed to facilitate computer-device communications over packet-data channels. A major objective of the present invention is to provide more effective use of a packet-data channel for a given FIFO buffer capacity.

Society has been revolutionized by the widespread availability of personal computers. As personal computers have become more powerful, the range of applications they serve has broadened. Increasing with the range of applications is the variety of peripherals that can be attached to personal computers. Early personal computers provided for a keyboard, a display, mass storage, and a printer. More recently, modems, musical instruments such as MIDI synthesizers, analytical instruments, speakers, televisions, video sources such as camcorders, game controllers such as joysticks, scanners, mice, color calibration equipment, graphics tablets, as well as new types of printers, displays, and mass storage devices, are attached to computers.

Where only a few devices are to be attached, each can have its own dedicated port. However, with the proliferation of computer peripherals, it has become desirable to provide ports that handle many peripherals at once. Various network protocols have been developed that allow many computers and devices to interact with each other. However, more cost-effective solutions are available where the goal is for a single computer to manage many peripheral devices. High-performance solutions include both parallel, e.g., small computers systems interface (SCSI), and serial IEEE 1394 (Firewire) buses. More economical serial buses include the Apple Desktop Bus (ADB), developed by Apple Corporation, and the Universal Serial Bus (USB), jointly developed by Compaq, Digital Equipment Corporation, IBM PC Company, Intel, Microsoft, NEC, and Northern Telecom. Of the more economical external buses, the USB is the most ambitious in terms of the number (127) of devices that can be attached and the varieties (isochronous, asynchronous) of data that can be handled.

A major challenge for external serial buses like the USB is that, while only one data stream can be handled at a time, the user must experience the effect of multiple concurrent data streams. For example, the user should be able to move the display cursor of a continuous controller, e.g., mouse, while a streaming audio-visual presentation is displayed. To provide the impression of concurrency, each data stream is divided into small packets, which can then be time multiplexed. The time multiplexing is governed by the host computer, which polls attached devices one at a time for data. To minimize interruption of other data streams, it is important that a device respond immediately to the polling. Correspondingly, the host computer may send data to a peripheral device, which should be ready to accept the host data immediately.

Data buffers help provide the desired immediacy to external bus communications. Data to be transmitted from a peripheral device can be pre-stored in a buffer so that it is ready for transmission whenever the device is polled by the host computer. A buffer can also be used to accept data as soon as it is transmitted from a host computer. Typically, first-in-first-out (FIFO) buffers are used to preserve the order of the data. A single device can have many FIFOs for both send and receive functions. The USB specification provides for up to 32 FIFOs per peripheral device.

Each data packet includes a number of data words. In the case of USB, the words are eight-bits each, so the words are referred to as bytes. Associated with each data source or destination (sink) within a USB peripheral device is a maximum packet data payload size between 1 and 1023 bytes. Each packet includes a header, referred to as a Packet ID, which indicates the type of packet, a Cyclic Redundancy Check (CRC) error detection code, and an end-of-packet indicator. A CRC code generated by the receiver may be compared to the transmitted CRC code to determine if the data was received without error. If the CRCs disagree, there was an error in the received packet.

If an error is detected, another attempt should be made to transfer the packet. Packet-data FIFOs include means for recreating the state that existed at the start of the erroneous transfer. In the case of a transmission, the transmitted data is saved until the packet is acknowledged, unlike a regular data FIFO buffer that would discard each data word as it is transferred. In the case of reception, an erroneously received data packet is cleared while any previously received valid packets are preserved.

A typical FIFO data buffer can include a write pointer that indicates the FIFO location to which a word is to be written and a read pointer that indicates the FIFO location from which a word is to be read. A packet-data FIFO buffer can also include a first-word pointer that indicates the FIFO memory location of the first word in the packet being transferred. This is the memory location to which one of the other two pointers is to be reset in the event of a failed packet transfer. When a FIFO is receiving data over the external serial bus, the first-word pointer marks the location to which the write pointer is to be reset on a receive error. When a FIFO is transmitting over the external serial bus, the first-word pointer marks the location to which the read pointer is to be reset on a transmit error indicated by the host computer. In effect, the first-word pointer stores the state of the buffer prior to the current data packet transfer.

Buffers with greater capacity are more expensive but offer more effective utilization of the external bus. A packet-data FIFO buffer should at least have the capacity to hold one maximum-sized packet. However, loading a second packet into a one-packet FIFO cannot begin until the first packet has been acknowledged. Thus, the second packet will not be available if a request for it immediately follows acknowledgment.

Intel discloses unidirectional FIFO buffers that hold two packets at a time. Once the first packet is transferred, the second packet is immediately available for transfer. A third packet can be loaded as the second packet is transferred. However it is possible that the third packet will not be completely loaded by the time the second packet is acknowledged. If the Intel design could accommodate FIFOs that handle more than two packets, the potential latencies could be reduced. However, to eliminate the latencies for all possible permutations of packet sizes would require a capacity of many maximum-sized packets. This would be costly method of maximizing bus utilization.

Furthermore, the Intel design requires considerable management overhead on the part of the controller of the incorporating peripheral device. Increasing the number of packets that this design could support would increase the management overhead. This reduces the time the controller can attend to activities, e.g., data generation and processing, other than bus management. Additionally, this overhead makes it very difficult, or even impossible, for a single FIFO to swap between transmission and reception modes in time to service a superseding request. Accordingly, two FIFOs are used when only one needs to be used at a time. What is needed is a packet-data FIFO buffer system that provides more effective utilization of an external bus while minimizing external support requirements so that rapid mode switching is possible and allowing a local controller more time to attend to non-bus related functions.

SUMMARY OF THE INVENTION

The present invention provides a packet-data FIFO buffer system in which each FIFO memory location includes a data section and a flag section. Each packet is subdivided into words, typically, eight bits (i.e., one byte) long. The words in a data packet are stored at respective consecutive FIFO address locations. Each flag section indicates whether or not the word stored in the respective data section is the last word of a packet. In addition, the FIFO buffer system includes end-of-packet detection means for determining whether or not a word being written to a FIFO address location is the last word of a packet. In the event a word is the last word, an indication to that effect is written to the respective flag section.

The FIFO buffer system can also include means for determining whether or not any of the flag sections of the FIFO buffer system contains an end-of-packet indication. For example, where a "1" is used to indicate the last word of a packet, an OR gate with inputs tied to all of the flag sections outputs a 1 when there is at least one complete packet stored in the FIFO buffer system, and a 0 when there are no complete packets stored.

The present invention provides for pointers that permit preservation of the portion of the state relating to a data-packet transfer of the FIFO buffer system at the beginning of the transfer. In the event of an error in the communication of the data packet, the initial state relating to that data-packet can be restored to provide for a retry.

The maximum allowed number of words in a data packet determines a minimum number of FIFO memory locations. Better usage of a connected communications channel can be achieved using a longer FIFO, for example, in which the number of FIFO memory locations is double the maximum packet size. Preferably, the number of FIFO memory locations is three or four times the maximum packet size to optimize channel usage and to relieve a local controller of the necessity of constantly monitoring FIFO activity to ensure optimal channel usage.

The present invention provides a FIFO buffer system that can handle transmission or reception or both. To save on memory locations, circuit area, and cost, a single-FIFO bidirectional buffer system can be used. The FIFO buffer can have separate receive and transmit modes. When the mode is switched, the FIFO buffer is emptied and readied for the mode switched to. For applications that cannot tolerate a loss of data stored in a FIFO, mode switching can be delayed until all FIFO data is successfully read out. In typical applications, such as USB, a mode switch that occurs while data is still in the FIFO would be the result of an aborted operation. In such a case, it is appropriate that the data be discarded. Preferably, the FIFO system includes means for selecting between purge and wait modes of handling stored data when a switch occurs between transmit and reception modes.

For applications that require bi-directional buffering, and cannot tolerate a mode switch delay or the loss of FIFO data upon a mode switch, the present invention provides a dual-FIFO buffer system with separate transmit and receive FIFO buffers. Some saving over using two separate FIFOs can be achieved by sharing a first-word pointer between the buffers. While such a system uses twice the number of FIFO memory locations, more optimal use of the communications channel is achievable.

The main advantage of the invention is the effective use of a communications channel, such as a Universal Serial Bus or other external serial bus, using a minimal amount of logic. FIFO capacity is not limited to a fixed number of data packets; if the data packets are small, more packets can be stored in the FIFO. Even when FIFO length is no greater than the maximum packet length, increased effectiveness is achieved. Where the FIFO length is three or four times that of the maximum packet, effectively uninterrupted bus usage can be achieved in either receive or transmit mode. If separate FIFOs are used for receive and transmit mode, even a mode switch need not result in a communications delay.

Another advantage of the invention is the reduced load on a local controller. The less time the controller spends managing FIFOs, the more time it has for other functions. The present invention provides for minimizing controller burden by incorporating FIFO management within the FIFO buffer system.

The simple yet powerful FIFO management that is embedded into the buffer system enables rapid swapping between transmit and receive modes. Thus a single FIFO may be effectively be used for bi-directional communications. This feature greatly reduces the size of the FIFO system.

The invention provides the foregoing advantages without imposing undue burdens on FIFO complexity or cost. As indicated above, the present invention provides for a single FIFO buffer to operate in receive mode, transmit mode or both, maximizing the utility of buffer memory. Alternatively, two buffers are used for bi-directional buffering, but component sharing reduces cost and complexity. Furthermore, the simple method of determining whether or not a complete packet is available in the buffer is both simple and inexpensive to implement.

| | |
|---|---|
| ALF | arithmetic logic unit |
| AP1 | single-FIFO packet-data buffer system |
| BIB | buffer input bus |
| BOB | buffer output bus |
| FFB | FIFO flag bus |
| FIF | FIFO buffer |
| FIN | FIFO interface |
| FLG | flag register |
| FWP | first-word pointer |
| HSB | host serial bus |
| LCB | local control bus |
| MDF | mode flag |
| ORF | OR gate |
| PRG | pointer register |
| RFP | read pointer |
| WRP | write pointer |

Figure 2:
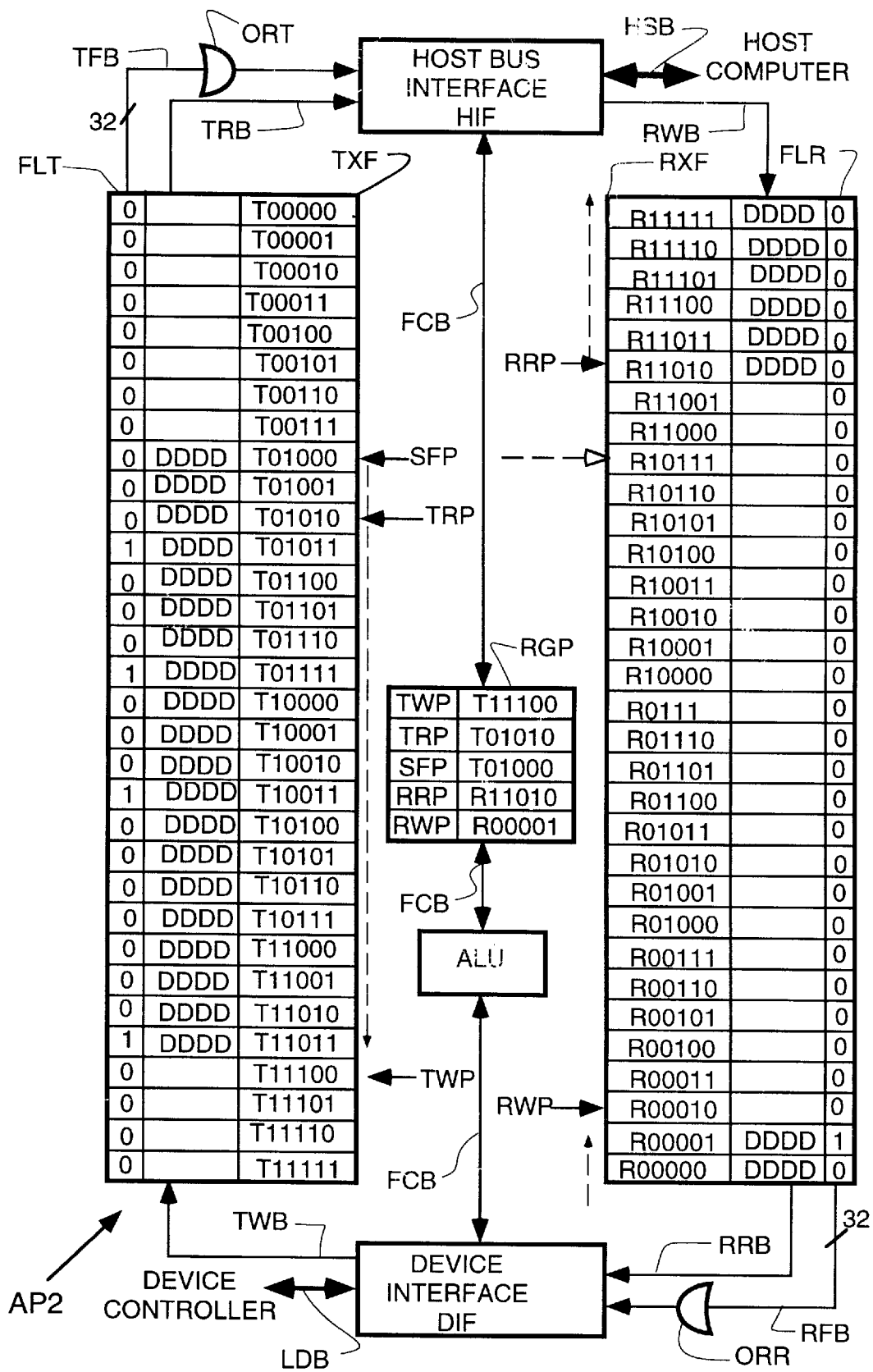

FIG. 2 is a schematic illustration of a dual-FIFO packet-data buffer system in accordance with the present invention. "The following table relates the references in FIG. 2 to elements of the system of FIG. 2."

| | |
|---|---|
| ALU | arithmetic logic unit |
| AP2 | dual-FIFO packet-data buffer system |
| DIF | device interface section |
| FCB | FIFO control bus |
| HIF | host-interface section |
| HSB | host serial bus |
| LDB | local device bus |
| ORR | read ready OR gate |
| ORT | transmit ready OR gate |
| RFB | receive flag bus |
| RGP | pointer register |
| RRB | receive read bus |
| RRP | receive read pointer |
| RWB | receive write bus |
| RWP | receive write pointer |
| RXF | receive FIFO |
| SFP | shared first-word pointer |
| TFB | transmit flag bus |
| TRB | transmit read bus |
| TRP | transmit read pointer |
| TWB | transmit write bus |
| TWP | transmit write pointer |
| TXF | transmit FIFO |

DETAILED DESCRIPTION OF THE PREFERRED EMBODIMENTS

Figure 1:
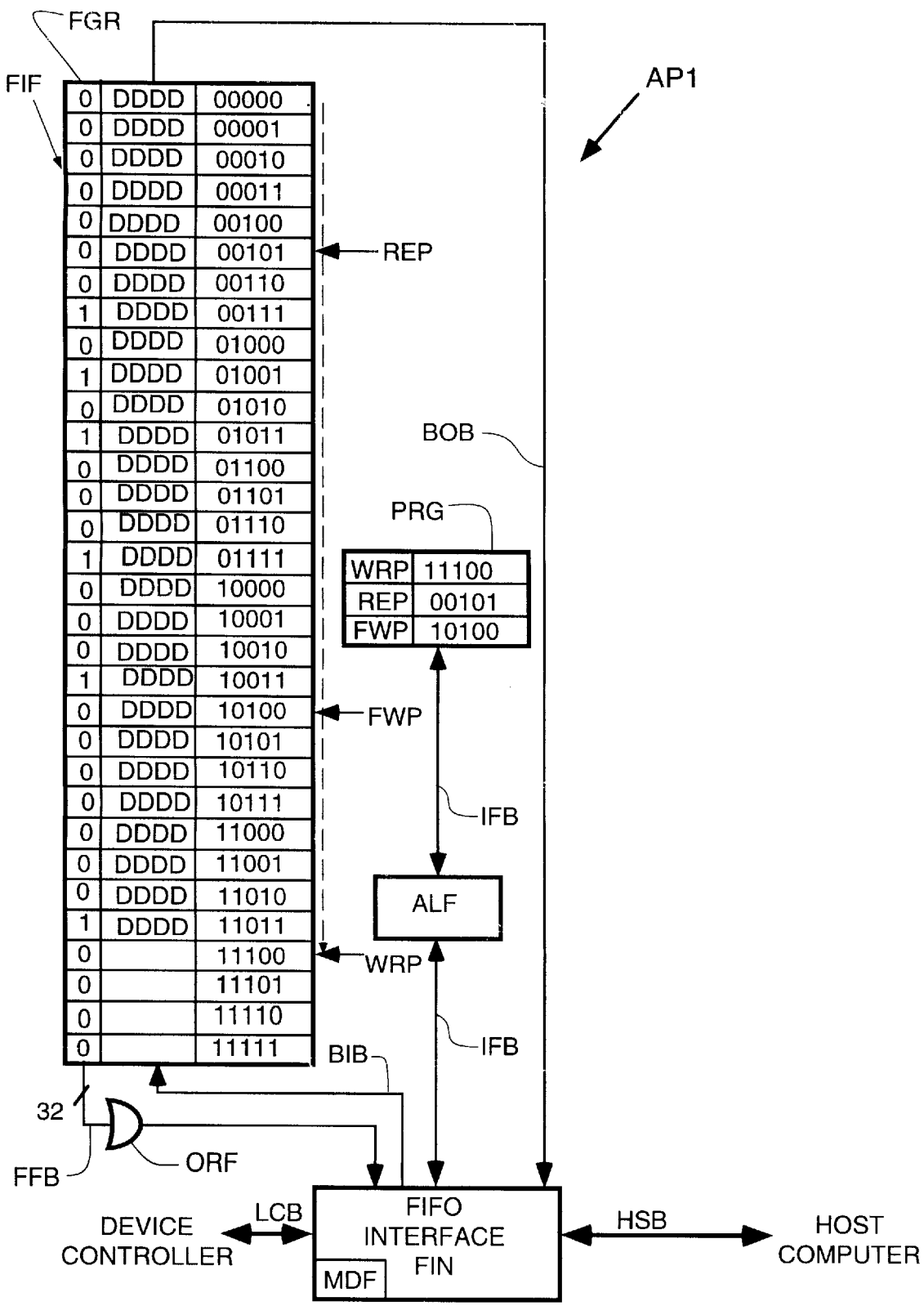
FIG. 1 is a schematic illustration of a single-FIFO packet-data buffer system in accordance with the present invention. "The following table relates the references in FIG. 1 to elements of the system of FIG. 1."

In accordance with the present invention, a single-FIFO packet-data buffer system AP1 comprises a FIFO buffer FIF, a pointer register PRG, an arithmetic logic unit ALF, a FIFO interface FIN, and an OR gate ORF, as shown in FIG. 1. FIFO system AP1 is incorporated in a laser printer that is configured to print documents transmitted by a host computer. Print data flows from the host computer along a host serial bus HSB to FIFO interface FIN, along an internal FIFO buffer input bus BIB, through FIFO buffer FIF, along an internal FIFO buffer output bus BOB, back through FIFO interface FIN, along a local control bus LCB, and to a device controller. The device controller manages printer functions. The host computer can request printer status data; in response, the device controller can transmit printer status data along the same path in the opposite direction with buses BIB and BOB interposed.

The word size for FIFO system AP1 is eight bits which is one byte. FIFO system AP1 is designed to handle data packets at most eight bytes in length. The capacity of FIFO buffer is 32 bytes, four times the maximum allowed packet size. For larger maximum packet sizes, a correspondingly larger FIFO buffer can be used. Each of the 32 memory locations has a respective address 00000-11111.

Each memory location can hold nine bits: an eight-bit data section can hold byte-wide data DDDD; a one-bit flag section is reserved for an end-of-packet (EOP) flag. The thirty-two flag sections can be considered a 32-bit flag register FGR. A "1" in a flag bit indicates that the data in the respective data section is the last data byte in a packet.

Pointer register PRG has three 5-bit registers, each storing a respective pointer. A write pointer WRP indicates the address of the FIFO location to be written to in a current writing operation; when no write is occurring, write pointer WRP indicates the next FIFO location to be written to in a next writing operation. FIFO buffer FIF is circular, so 00000 is the next address after 11111. A read pointer REP indicates the current memory location being read during a read operation; if there is no current read operation, read pointer REP indicates the next memory location to be read.

A first-word pointer FWP allows the status of buffer system AP1 to be restored in the event of a faulty packet transfer. During transmission, first-word pointer FWP indicates the first word of the packet being read from FIFO buffer FIF and transmitted along host system bus HSB. During reception, first-word pointer FWP indicates the first word of the packet that is received along host serial bus HSB and written to FIFO buffer FIF.

If packet transmission fails, read pointer REP is reset to first-word pointer FWP; if the packet transmission succeeds, first-word pointer FWP is set to read pointer REP. During reception, first-word pointer FWP indicates the first word of the packet being received. If the reception is unsuccessful, write pointer WRP is reset to first-word pointer FWP; if the reception is successful, first-word pointer is set to write pointer WRP.

FIFO system AP1 operates as follows. Upon initialization, all EOP flags and all pointer registers are set to zero; system AP1 is set by the device controller to a receive mode. If the host has data that it wishes to transmit, it will signal its intention and immediately follow this with a packet of data. As the data is received it is written into FIFO FIF, as long as space permits. Should there be more data than can fit in the free registers of buffer FIF, FIFO interface FIN will wait for the end of the transmission and then send a negative acknowledge signal back to the host—indicating that the host should try to send the packet again later. In no case will the new data overwrite unread data already in buffer FIF. Thus, even if there is not enough room for a full packet at the beginning of the transaction, the transaction may still be able to complete because the transaction may involve a less than full size packet or data may have been read out of buffer FIF during the transaction, making more space for the incoming data.

FIFO interface FIN determines if there is free space in buffer FIF by comparing WRP and REP. As long as these two are not equal, there is space in buffer FIF. However, these two registers are equal in two cases; one when buffer FIF is full, and the other when buffer FIF is empty. This ambiguity is resolved by looking at the output of OR gate ORF. If the output is 1, and pointers WRP and REP are equal, buffer FIF is full. If the OR gate output is 0 and two pointers are equal, buffer FIF is empty. Thus, buffer full and empty indications can be easily generated. Under the initial conditions, the two pointers are equal and the output of OR gate ORF is 0. This indicates buffer FIF is empty, so data can be written into the FIFO.

The host computer transmits an eight-byte packet of print data along host serial bus HSB to FIFO system AP1, where the data is received by FIFO interface FIN. FIFO interface FIN transfers the print data along buffer input bus BIB to buffer FIF. The first byte is written to the initial location of write pointer WRP, which is address location 00000. Once the first byte is written, write pointer WRP is incremented to address 00001, and the next data byte of the packet is written in the corresponding memory location. This writing and incrementing continues until the eighth data byte of the packet is written at address 00111.

At this time, FIFO interface FIN detects an EOP indication. If the reception is successful, the CRC error checking code generated by FIN will match the CRC error checking code transmitted by the host. If the error checking codes do not match, a reception error is indicated. Similarly, if the amount of data sent was greater than the number of free registers in the FIFO, a negative acknowledge indication is sent. In either case, FIFO interface FIN resets write pointer WRP to first-word pointer FWP, which is at 00000. System AP1 is ready to try to receive the packet again.

If the error detection logic in FIFO interface FIN indicates a successful reception, it sets the EOP flag for the last address 00111 to 1, and acknowledges receipt of the complete packet to the host computer. At this point, the write pointer WRP is incremented to address 01000, while read pointer REP is still at 00000. Since the reception was successful, first-word pointer FWP is set equal to the new value of WRP. The output of OR gate ORF goes high. The 32 inputs of OR gate ORF are coupled via FIFO flag bus FFB to respective bits of flag register FGR. Thus any EOP flag set results in a high OR gate output. In receive mode, this high output indicates that data is ready for reading by the device controller. However, in the present case, the device controller is otherwise occupied, so readout is postponed.

In the meantime, the host computer sends additional packets of 2, 2, 4, 4, and 8 bytes in length. For each byte of each packet, a write plus increment of the write pointer WRP occurs. With each end of packet, FIFO interface FIFO sets the appropriate EOP flag to 1 and packet receipt is acknowledged.

After the flag at address 11011 is set, the host computer sends another packet. In this case, there are only four empty locations 11100-11111. The device receives 4 bytes and writes them to buffer FIF. It then sees that buffer FIF is full and an end of packet indication hasn't been received. FIFO interface FIN blocks any further writes into FIFO buffer FIF and waits for reception of the end of packet signal. It then resets write pointer WRP to first-word pointer FWP and signals a negative acknowledge to the host via host serial bus HSB. In this illustrative case, some host serial bus capacity is wasted. However, this waste could easily have been avoided if the device controller had begun reading before or during the reception of the last packet.

At this point, the device controller attends to FIFO system AP1 and detects the indication from OR gate ORF that a packet is available to be read. Accordingly, the 9-bit data at the initial position of read pointer REP is read, that is, transferred along FIFO buffer output bus BOB to FIFO interface FIN. FIFO interface FIN strips the negative boundary flag and passes the first byte of data to the device controller. Read pointer REP is incremented to address 00001.

FIG. 1 shows the status of FIFO system AP1 as the sixth byte of the first packet is being read. Read pointer REP indicates address 00101. After two more bytes are read, FIFO interface FIN detects the positive EOP flag from address 00111 and converts it to an EOP indicator understandable to the device controller. FIFO interface FIN writes a 0 to the EOP flag section at 00111. However, since other flag bits are still 1, the output of OR gate ORF does not change. Device controller still has a positive indication of packets to be read. At this point, if the host computer sends another full packet, there will be sufficient space for it. In this case, there are 12 empty locations: 11100-00111.

The host system can request status information from the printer. To provide this information, device controller switches FIFO interface FIN to transmit mode. In response, FIFO interface FIN resets FIFO buffer FIF and pointer register PRG. Thus, all pointers are set to 00000 and all EOP flags are set to zero.

FIFO interface FIF includes a mode flag MDF. When mode flag MDF is set to 0, a purge mode is in effect. In purge mode, any data in buffer FIF at the time of a switching between transmit and receive mode is purged. This is an appropriate action in the case the switch is due to an aborted transfer. In wait mode, the switch is not completed until all data stored in buffer FIF is transferred. FIFO buffer system AP1 can be installed (hardwired) so that mode flag MDF is permanently set to either 0 or 1 where there is not need to switch between purge and wait modes.

From this point, it is the device controller that sends information to be written into FIFO buffer FIF. When the controller writes the last word of the packet, it indicates the end of the packet to FIFO interface FIN, which in turn writes a 1 into the corresponding EOP flag. When the host indicates that the data should be sent, FIFO interface FIN checks to make sure that the output of OR gate ORF is positive and then reads out the first packet in the buffer and transmits it to the host computer. As each word is read out, read pointer REP is incremented, while the memory location of the first word of the packet remains indicated by first-word pointer FWP. When a successful transmission is indicated, the EOP flag corresponding to the last word of the packet is set to zero and first-word pointer FWP is set to read pointer REP at the beginning of the next packet. If the transmission is unsuccessful, read pointer REP is set to FWP at the beginning of the unsuccessfully transmitted packet for a retransmission.

Since the connection of FIFO buffer system AP1 is much more intimate with the device controller than it is with the host computer, more information can be communicated conveniently. One case where this additional information can be useful is in communicating available FIFO buffer capacity. In transmit mode, the controller can compare the available capacity with the next packet to be sent. If the packet is small enough, the packet can be sent even though there was not room for a maximum-sized packet. In fact, the controller can even arrange the data so that the next packet fits whatever capacity is available.

Arithmetic logic unit ALF provides FIFO status information other than the available capacity of FIFO buffer FIF. In normal operation, REP-FWP $\leq 111=7_{10}$ (i.e., one less than the maximum packet size). ALF can calculate the difference and make the comparison for use in generating a read error signal when the condition is not met.

Likewise, FIFO interface FIN will block any attempt to move the read pointer REP past the write pointer WRP, which would result in reading data from "empty" registers. All such attempts will cause FIFO interface FIN to generate an error signal to the device controller.

Finally, the host system can request to transmit additional data for printing. In response, the mode of FIFO system AP1 is switched to receive mode, and FIFO buffer FIF and pointer register PRG are reset to zeroes.

It should be noted that in purge mode when FIFO system AP1 is reset, as it is when a mode switch occurs, all data stored in FIFO buffer FIF is effectively erased. In many cases, this is the desired behavior as such a switch before the data has been transmitted, or read and acknowledged, would indicate an abort of the overall transaction. It is an important advantage of this system that it is so simple that an abort can occur quickly and cleanly without external intervention, obviating the need for two separate FIFOs.

It is also important to note that, in a typical system, control/status transactions would use a single bi-directional FIFO, while bulk transactions (e.g. data to be printed) would use a dedicated receive only FIFO. To simplify the description, the preferred embodiment has been described with a single bi-directional FIFO. The handshaking in control/status transactions requires that no new transaction may begin until all data has been transmitted by the source and consumed (i.e. read out of the FIFO) by the sink.

However, there are some applications where such data erasure is not acceptable. Data loss is avoided in wait mode by delaying any transmission/reception mode switches or other resets until all packets in FIFO FIF have been read. This delay can result in non-optimal use of host serial bus HSB.

To achieve this optimal use, separate FIFO systems, one dedicated to receiving and the other dedicated to transmitting can be used. In this case, receiving and transmitting could in principle take place concurrently. However, the nature of a serial bus effectively precludes such concurrency. At some time scale, the transmitting and receiving are time multiplexed. Where this is the case, the present invention provides an alternative embodiment which optimizes serial bus use, while slightly reducing device complexity relative to the use of separate transmit and receive FIFOs buffer systems.

Accordingly, the present invention provides a dual-FIFO packet-data buffer system AP2 comprising a transmit FIFO TXF, a receive FIFO RXF, a pointer register RGP, an arithmetic logic unit ALU, a host interface section HIF, a device interface section DIF, a transmit ready OR gate ORT, and a read ready OR gate ORR. Host interface section HIF and device interface section DIF collectively constitute a FIFO controller. The two sections communicate with each other and other FIFO components over an internal FIFO control bus system FCB. Host interface section HIF communicates with a host computer via a host serial bus HSB. Device interface section DIF communicates with the controller of an incorporating device, such as a printer, scanner, etc., over a local device bus LDB.

Transmit FIFO TXF is designed to hold data to be transferred from the incorporating device to the host system via host serial bus HSB. In this case, the device is designed to handle a maximum packet size of eight bytes, and FIFO TXF has a 32-byte capacity to hold four maximum-sized packets at once. The thirty-two data storage locations are respectively identified by six-bit addresses TBBBBB, where 0=T, and T indicates the transmit data locations.

Each transmit FIFO memory location has two sections, an eight-bit data section and a one-bit flag section, as in system AP1. Thus, the data stored at address T01111 is the last byte of a four-byte packet beginning at address T01100. The number (4 illustrated) of packets stored in transmit FIFO TXF is determined simply by counting the number of EOP flags set to 1.

Receive FIFO RXF is designed to hold data transferred from a host system to the device incorporating FIFO system AP2. Like FIFO TXF, receive FIFO RXF has a 32 nine-bit memory locations, eight bits being dedicated to transfer data and one-bit assigned for EOP flags. Each location has a respective address RBBBBB, where the Bs represent binary values, and R=1, where R indicates receive buffer memory locations. In FIG. 2, receive buffer RXF holds one eight-byte packet extending from location R11010 to R00001. This illustrates that receive FIFO RXF is circular in that incrementing from location R11111 yields location R00000. Transmit FIFO TXF is similarly circular.

Associated with each FIFO RXF, TXF, is a write pointer, a read pointer, and a first-word pointer. In the case of FIFO system AP2, only one of the FIFOs is used for transferring data at a time. Accordingly, the two FIFOs share a first-word pointer. Thus, pointer register PRG includes five locations respectively for a transmit write pointer TWP, a transmit read pointer TRP, a shared first-word pointer SFP, a receive write pointer RWP, and a receive read pointer RRP.

Upon initialization or FIFO system reset, TRP=TWP= T00000 and RRP=RWP=SFP=R00000. If the host system requests data, the FIFO mode is set to transmit, and shared first-word pointer SFP is set to T00000. Since the output of OR gate ORT is 0 on initialization, host interface section HIF indicates to the host system that it is not ready to transmit data.

The device controller transmits data to device interface section DIF, which writes the requested status data byte-by-byte into transmit FIFO TXF via transmit write bus TWB. The first byte is written into location T00000, and write pointer TWP is incremented to T00001, which is where the next byte is written. This continues until the last byte of the packet is written to location T00111. At this point an EOP signal from the device controller is detected by device interface DIF, which writes a 1 to the EOP flag bit for address T00111. The write pointer TWP is incremented to T01000. Additional packets can be written as illustrated for system AP1 in FIG. 1.

Upon a data request from the host, transmission of data to the host system begins with a reading of the byte stored at the memory location T00000 indicated by transmit read pointer TRP. The data so read is conveyed to host interface section HIF via transmit read bus TRB. Host interface section HIF then transmits the data along host serial bus HSB to the host computer. Transmit read pointer TRP increments one location at a time until host bus interface HIF detects a flag bit set to 1 at location T00111. At that point, an end-of-packet is sent and reading halts until an acknowledgment that a complete packet was received arrives from the host system. If instead, the indication that the packet was not received correctly by the host system, transmit read pointer TRP is reset equal to shared first-word pointer SFP and the packet is retransmitted.

If the acknowledgment is received, shared first-word pointer SFP is set equal to transmit read pointer TRP, and the flag at T00111 is set to zero. The second packet can be transmitted as soon as it is requested. Transmission of the second packet begins, with transmit read pointer TRP incrementing with each word. FIG. 2 shows the status of transmit FIFO buffer TXF as the third word of the second packet is being transmitted.

Operation of receive FIFO RXF is similar. Data received from the host system is transferred from host bus interface section HIF along receive write bus RWB to receive FIFO buffer RXF to be written to memory location R00000. The next byte is written at R00001, with receive write pointer RWP being incremented after each byte until an end-of-packet determination causes a boundary flag to be set. If the packet was received without error, SFP is set equal to RWP. If there was an error reported, RWP is set equal to SFP so that the transmission may be retried. The EOP indication causes the output of OR gate ORR to go high, informing device interface section DIF and thus the device controller that a packet is ready to be read. As data is read out of receive FIFO RXF along receive read bus RRB through device interface section DIF and into the incorporated device controller, receive read pointer RRP is incremented. When a packet is completely read, the boundary flag is set equal to zero. In the illustrated state, several packets have been written to FIFO RXF and all but one have been transferred to the device. The remaining packet, which cycles from the highest receive FIFO address to the lowest receive FIFO address, remains in place when the FIFO mode is switched from receive to transmit. This packet is available for reading at a later time, unless the receive FIFO RXF is cleared before it is next read.

FIG. 2 shows FIFO RXF after several packets have been received and all but one have been read out. The remaining packet begins at R11010 and ends at R0001, an example of wrap around. The next packet to be received can be written beginning at R00010, while a read of the existing packet can begin at R11010.

Status information other than the presence of a complete packet can be made, as in system AP1, by comparing pointer positions. These comparisons are made by arithmetic logic unit ALU and communicated to interface section HIF and DIF via FIFO control bus FCB.

One of the options provided by system AP2 is whether to leave data in the inactive FIFO. For example, if while packets are being transmitted, the host indicates that it now wants to send data, there may be data left in the transmit buffer while the receive buffer is activated. Depending on the application, the stored transmit data may be needed later. Furthermore, the device may not be able to regenerate the data. If the data is preserved, it is available for transmission as soon as the next transmission is requested. On the other hand, if the data is not wanted, the transmit FIFO can be cleared before the transmit mode is resumed.

The present invention provides for embodiments other than the illustrated embodiments. Different packet sizes can be handled. For many devices, longer maximum packets should be managed. FIFO buffer lengths should be extended proportionally. The capacity of the FIFOs in terms of the number of full-sized packets that can be stored can be varied from one to more than four. Larger numbers allows the device controller more time to attend to non-communications functions. Different data word sizes can be handled by the FIFOs. Different communications protocols can be accommodated. These and other variations upon and modification to the illustrated embodiments are provided for by the present invention, the scope of which is limited only by the following claims.

What is claimed is:

1. A FIFO buffer system for packet data including a series of data words, said system comprising:

a series of FIFO memory locations for holding packet data for transfer, said memory locations including respective data sections for storing one of said data words, said memory locations including respective flag sections for storing respective end-of-packet indications, each end-of-packet indication stored in an end-of-packet section indicating whether or not the data word stored in the respective one of said data sections is the last word of a packet;

boundary detection means for detecting whether or not the data word to be stored at a given one of said FIFO registers is or is not the last data word in a packet, said boundary detection means in the event the current data word is the last data word of a packet writing an indication to that effect in the respective end-of-packet section;

host interface means for, in a transmission mode, transmitting an outgoing data packet stored in said FIFO memory locations to a host system and for, in a reception mode, receiving an incoming data packet and storing it in said FIFO memory locations; and mode selection means for selecting between a purge mode and a wait mode, said FIFO buffer system when in purge mode purging all data in said FIFO memory locations in the event of a switch between said transmission mode and said reception mode, said FIFO buffer system wherein said wait mode transferring all data in said FIFO before completing a switch between said transmission mode and said reception mode.

* * * * *